United States Patent
Vechart et al.

(10) Patent No.: US 9,915,925 B2
(45) Date of Patent: Mar. 13, 2018

(54) INITIATED TEST HEALTH MANAGEMENT SYSTEM AND METHOD

(71) Applicant: HONEYWELL INTERNATIONAL INC., Morristown, NJ (US)

(72) Inventors: Andrew Peter Vechart, Plymouth, MN (US); Darryl Busch, Eden Prairie, MN (US); Dale Frederick Enns, Roseville, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 721 days.

(21) Appl. No.: 14/189,247

(22) Filed: Feb. 25, 2014

(65) Prior Publication Data

US 2015/0241853 A1 Aug. 27, 2015

(51) Int. Cl.
*G05B 9/02* (2006.01)
*G05B 23/02* (2006.01)

(52) U.S. Cl.
CPC ........... *G05B 9/02* (2013.01); *G05B 23/0256* (2013.01)

(58) Field of Classification Search
None
See application file for complete search history.

(56) References Cited

U.S. PATENT DOCUMENTS

| | | | |
|---|---|---|---|
| 5,023,791 A | 6/1991 | Herzberg et al. | |
| 5,214,582 A | 5/1993 | Gray | |
| 5,260,874 A | 11/1993 | Berner et al. | |
| 6,127,970 A | 10/2000 | Lin | |
| 6,622,972 B2 | 9/2003 | Urnes, Sr. et al. | |
| 6,684,182 B1 | 1/2004 | Gold et al. | |
| 7,441,236 B2 | 10/2008 | Chon et al. | |
| 7,496,434 B2 | 2/2009 | Fossen et al. | |
| 7,818,103 B2 | 10/2010 | Johansen et al. | |
| 7,877,231 B2 * | 1/2011 | Bharadwaj | G05B 19/4065 700/21 |
| 7,904,282 B2 | 3/2011 | Goebel et al. | |

(Continued)

FOREIGN PATENT DOCUMENTS

| | | |
|---|---|---|
| EP | 2148257 A2 | 1/2010 |
| EP | 2444870 A2 | 4/2012 |

OTHER PUBLICATIONS

Boskovic et al. "A Robust Adaptive Reconfigurable Flight Control Scheme for Accommodation of Control Effector Failures", 2001, pp. 1127-1132.*

(Continued)

*Primary Examiner* — Van Nguyen
(74) *Attorney, Agent, or Firm* — Lorenz & Kopf, LLP

(57) ABSTRACT

A system and method for verifying the response capabilities of a control effector include processing, in a test module, at least command data and sensor data associated with the control effector to generate control effector health data representative of control effector health. The control effector health data are processed in a reasoner to selectively indict and clear one or more faults, determine a failure is uncertain based on the one or more indicted faults, determine one or more test excitation signals to supply to the control effector to verify whether the uncertain failure is present or absent, and supply the one or more test excitation signals to a controller that is in operable communication with the control effector.

15 Claims, 12 Drawing Sheets

(56) References Cited

U.S. PATENT DOCUMENTS

| | | |
|---|---|---|
| 8,340,793 B2 * | 12/2012 | Kamenetz .......... G05B 19/0428 700/82 |
| 8,380,386 B2 | 2/2013 | Gomiero et al. |
| 8,380,473 B2 | 2/2013 | Falangas |
| 9,046,891 B2 * | 6/2015 | Busch ................ G05B 23/0256 |
| 2007/0050104 A1 * | 3/2007 | Wallace .................... B60T 7/14 701/31.4 |
| 2007/0260438 A1 | 11/2007 | Langer et al. |
| 2008/0234994 A1 | 9/2008 | Goebel et al. |
| 2010/0017049 A1 | 1/2010 | Swearingen et al. |
| 2010/0023301 A1 * | 1/2010 | Bharadwaj ......... G05B 19/4065 702/183 |
| 2010/0162027 A1 * | 6/2010 | McCroskey ....... G05B 23/0291 714/1 |
| 2011/0029804 A1 * | 2/2011 | Hadden ................ G05B 15/02 714/1 |
| 2012/0101777 A1 | 4/2012 | Busch et al. |
| 2014/0088736 A1 * | 3/2014 | Cohen ...................... G05B 9/03 700/79 |

OTHER PUBLICATIONS

Singh et al. "A Factorial Hidden Markov Model (FHMM)—based Reasoner for Diagnosing Multiple Intermittent Faults", 2009 IEEE, pp. 146-151.*

Extended EP Search Report for Application No. 14196644.0-1807/2911025 dated Oct. 15, 2014.

* cited by examiner

INITIATED TEST HEALTH MANAGEMENT SYSTEM AND METHOD

STATEMENT REGARDING FEDERALLY SPONSORED RESEARCH OR DEVELOPMENT

This invention was made with Government support under FA8650-08-D-7803 awarded by the Air Force Research Laboratory (AFRL). The Government has certain rights in this invention.

TECHNICAL FIELD

The present invention generally relates to health management and, more particularly, to a system and method of determining the lost and/or remaining functional capabilities of a control effector using various health-related data.

BACKGROUND

Various systems, such as various types of vehicles and the systems and subsystems that comprise the vehicles, may be subject to potentially severe environmental conditions, shock, vibration, and normal component wear. These conditions, as well as others, may have deleterious effects on vehicle operability. These deleterious effects, if experienced during operation, could leave little time for corrective actions. Hence, most notably in the context of vehicles, health monitoring/management systems are increasingly being used. Vehicle health monitoring/management systems monitor various health-related characteristics of the vehicle. Such operational health characteristics may, in some instances, be further decomposed to the health characteristics of major operational systems and subsystems of the vehicle.

Some presently known vehicle health management systems include monitors that gather data from sensors and other onboard signals to produce results. These results are then provided to a reasoner, which tries to diagnose the health of the vehicle based on this information. Sometimes, this information arrives at the reasoner slowly or not at all. For example, prior to lift-off of an autonomous vehicle, no commands have been provided to the control effectors, and health management has insufficient information with which to diagnose effector health. To overcome this deficiency, it is common to perform pre-flight checks that exercise the control effectors to verify their operation. As a second example, if a suspected effector fault occurs during the flight of the autonomous vehicle, it would be desirable to assess the health of the effector as soon as possible after onset. Since there are times during the flight where the commands are minimal, assessing the health could entail deliberately exercising the suspected effector, while taking care to maintain control. The deficiency in quantity and type of health information or the rate of generation of the information may limit the ability of the health management system to provide a prompt assessment of the vehicle capabilities, potentially endangering the mission, the vehicle, or both.

Hence, there is a need for a system and method that will accelerate the information flow into a health management system to be able to provide more prompt diagnoses of system health. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method for verifying the response capabilities of a control effector includes processing, in a test module, at least command data and sensor data associated with the control effector to generate control effector health data representative of control effector health. The control effector health data are processed in a reasoner to selectively indict and clear one or more faults, determine a failure is uncertain based on the one or more indicted faults, determine one or more test excitation signals to supply to the control effector to verify whether the uncertain failure is present or absent, and supply the one or more test excitation signals to a controller that is in operable communication with the control effector.

In another embodiment, a system for determining the response capabilities of a control effector includes a test module and a reasoner. The test module is adapted to receive at least command data and sensor data associated with a control effector. The test module is configured, upon receipt of these data, to generate control effector health data representative of control effector health. The reasoner is coupled to receive the control effector health data and is configured, in response thereto, to (i) selectively indict and clear one or more faults, (ii) determine a suspected failure that may be caused by one or more indicted faults, (iii) determine one or more test excitation signals to supply to the control effector to verify whether the suspected failure is an actual failure, and (iv) supply the one or more test excitation signals to a controller that is in operable communication with the control effector.

Furthermore, other desirable features and characteristics of the initiated test health management system and method will become apparent from the subsequent detailed description, taken in conjunction with the accompanying drawings and this background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
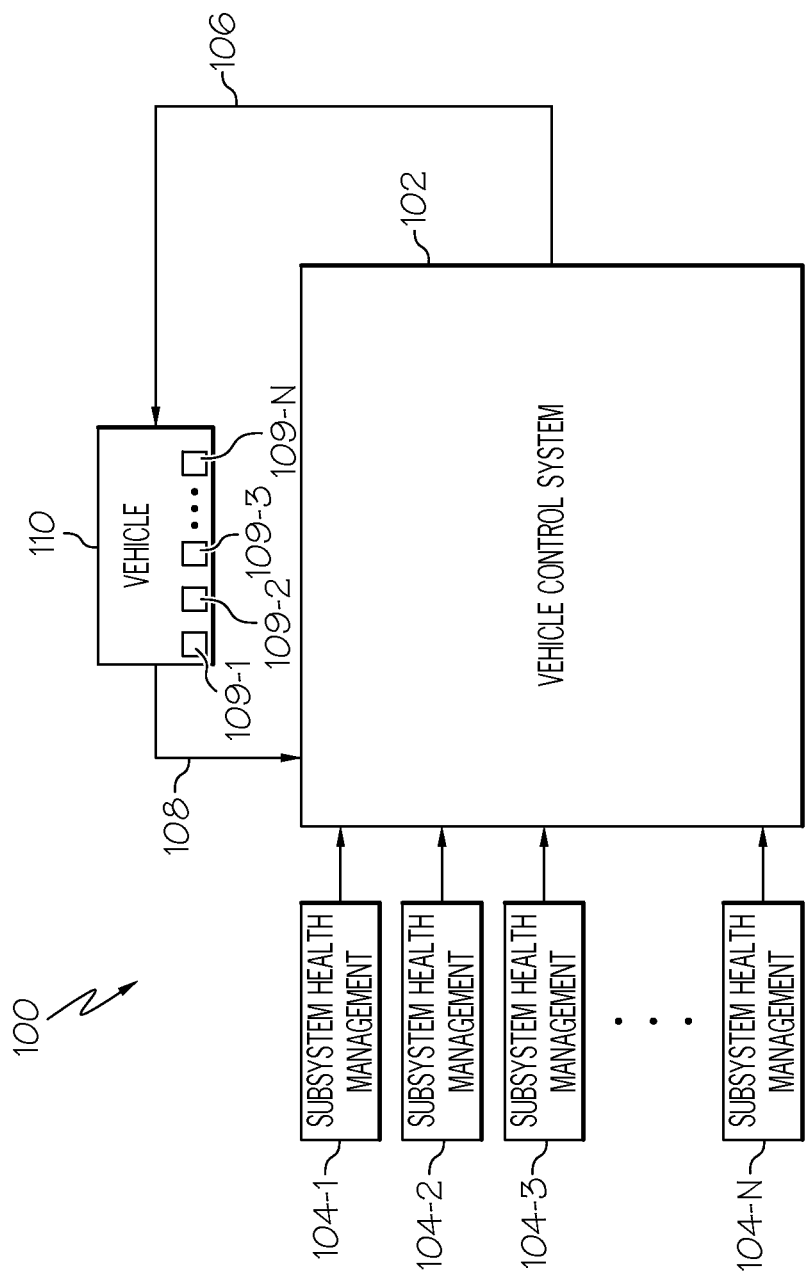
FIG. 1 depicts a functional block diagram of an embodiment of an example vehicle guidance and control system.

A functional block diagram of an embodiment of a vehicle guidance and control system 100 is depicted in FIG. 1, and includes a vehicle control system 102 and one or more subsystem health management systems 104 (e.g., 104-1, 104-2, 104-3, . . . 104-N). The vehicle control system 102 implements at least one or more adaptive control laws that generate and supply various commands 106 to various components 109 in or on, for example, a vehicle 110. The components may vary, but include at least a plurality of control effectors (e.g., 109-1, 109-2, 109-3 . . . 109-N) that are configured to control, for example, the position of one or more devices.

The vehicle control system 102 also receives feedback 108 from, for example, various sensors in or on the vehicle 110, and data 112 from the one or more subsystem health management systems 104. The one or more control laws in the vehicle control system 102 are adaptive control laws, in that the control laws adaptively respond to the data supplied from the one or more subsystem health management systems 104. A typical response of the adaptive control law implemented in the vehicle control system 102 is to limit further commands to the effector to its reduced usable range, and to make more use of other effectors as necessary to maintain control. Further response could include changing the envelope of operation of the vehicle and changing the mission plan. The adaptive control laws may be implemented using any one of numerous known adaptive control law schemes generally known in the art.

Figure 2:
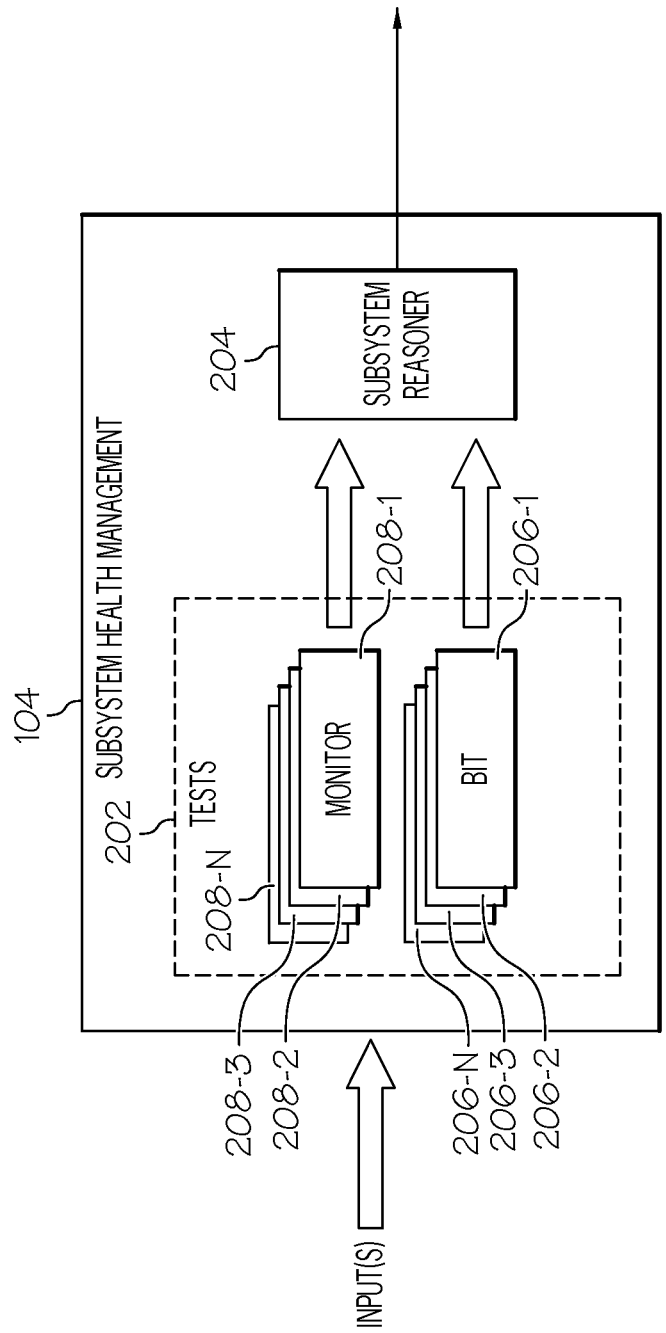
FIG. 2 depicts a functional block diagram of an exemplary embodiment of a subsystem health management system that may be used in the system of FIG. 1.

One or more of the subsystem health management systems 104 are coupled to receive various inputs, such as at least a portion of the commands 106 and feedback 108 supplied to the vehicle control system 102 and/or sensors dedicated to health monitoring. These one or more subsystem health management systems 104 are additionally configured, based in part on these inputs, to detect, isolate, and quantify various faults, failures and degradations that may occur within the associated subsystem, and to supply data representative thereof to the adaptive control laws in the vehicle control system 102. To provide the most accurate information to the vehicle control system 102, the subsystem health management systems 104 are configured to report not only full functional failures, but also parametric degradations of capabilities. Thus, these subsystem health management systems 104 are configured to handle various diagnostic complexities including, but not limited to, ambiguity, latency, false negatives and false alarms. Referring now to FIG. 2, a functional block diagram of an exemplary embodiment of a subsystem health management system 104 is depicted, and will now be described.

The exemplary subsystem health management system 104 includes a tests module 202 and a subsystem reasoner 204. The tests module 202 is coupled to receive at least command data and sensor data associated with one or more of the control effectors 109, and is configured, upon receipt of these data, to generate control effector health data representative of control effector health. In a particular embodiment, the tests module 202 is configured to continuously or intermittently implement various tests and/or measurements on the associated subsystem (e.g., control effector), and to generate health data representative of subsystem health (e.g., good health/bad health). The health data are then supplied to the subsystem reasoner 204. The health data generated and supplied by the tests module 202 may vary and may include, for example, PASS/FAIL data to indicate a component or portion of the subsystem is healthy/unhealthy. The health data may additionally include data that indicate specific conditions were not right to perform the test, such as returning the result NOT_AVAILABLE or remaining silent. Some tests may have two or more failure criteria. For such tests, the health data may include qualified FAIL data such as, for example, PASS/FAIL-HI/FAIL-LO, etc. As may be appreciated, different failure criteria may lead to different failure conclusions.

It will be appreciated that the tests module 202 may be variously configured to implement its functionality. In the depicted embodiment, however, the tests module 202 implements its function using one or more built-in test module 206 (e.g., 206-1, 206-2, 206-3, . . . 206-N) and one or more monitor modules 208 (208-1, 208-2, 208-3, . . . 208-N). A built-in test (BIT) module 206, as is generally known, is configured to implement one or test procedures on a subsystem and/or component to determine whether the subsystem and/or component is functioning properly.

The monitor modules 208 (which may also be referred to herein as parametric limit monitor modules) are configured to receive various data representative of one or more subsystem parameters and determine whether a subsystem and/or component that is not tested by a BIT module 206 (or is perhaps not adequately tested by a BIT module 206) is functioning properly. Moreover, one or more of the monitor modules 208 are additionally configured to supply data representative of the degree of degradation. In particular, these monitor modules 208, which are referred to herein as parametric limit monitor modules 208, are preferably configured to measure the degradation of one or more parametric control limits. Thus, in addition to determining PASS/FAIL status, the health data supplied by parametric limit monitor modules 208 include data representative of, for example, one or more parameters. It will be appreciated that the specific parameters may vary. For example, the parameters may include an input command and the response to that input command. In the context of an actuator or a component moved by an actuator, the parametric control limits of interest may include the upper limit and lower limit of position, the maximum slew rate, the maximum small-signal bandwidth, and the maximum force/torque. The command and response parameters returned by the monitors may include position, rate, current, voltage, and control limits, just to name a few. It will be appreciated that a "PASS" result associated with an input command notionally indicates that the applicable control law may continue issuing those commands, whereas a "FAIL" result notionally indicates that the control law should no longer issue that command. As an example of the latter, if a component were commanded to move at a rate of 20 units/second but moved at only a rate of 10 units/second, a parametric limit monitor module 208 would return a FAIL result, and that 20 units/second was attempted but only 10 units/second was achieved.

The subsystem reasoner 204 receives the health data supplied from the tests function 202 and determines which failure(s) and/or degradation(s) are present and, if degradation is present, determines the degree of degradation. More specifically, the reasoner 204 is coupled to receive the health data and is configured, in response thereto, to selectively indict and clear one or more faults, determine one or more failures that cause indicted faults, and determine, based on the one or more determined failures, a usable range of control effector commands to which the control effector can respond. In some instances, the subsystem reasoner 204 may additionally issue an action to be performed to prevent further damage of a faulty/degraded subsystem or to prevent cascading failures in other subsystems. The manner in which the subsystem reasoner 204 is implemented allows it to handle various diagnostic complexities including, for example, fault ambiguity, latency, false positives, false negatives, and intermittency, just to name a few. Although conceptually one might associate a FAIL result from a particular test with the presence of a particular fault or failure, the reasoner is the final arbiter.

As a means to that end, the subsystem reasoner 204 implements diagnostic inference to compute which faults may be present. Faults are intermediate conclusions in the reasoner 204 that account for the fact that a given failure/degradation can be caused by various underlying causes that produce distinct test evidence. Faults need only be modeled to the extent that they produce different test evidence. For example, a stuck actuator failure can be caused by a mechanical jam fault or a communications fault, and the evidence for these two faults is different.

The subsystem reasoner 204 tracks the health data supplied from the tests module 202, and makes fault determinations based on cumulatively collected results (i.e., cumulative evidence). This is because tracking cumulative results will more accurately reflect subsystem health state rather than an instantaneous result. For non-parametric tests, the cumulative evidence will preferably take on the discrete states, such as, for example: UNKNOWN, PASS, FAIL, FAIL-[qualifier1]/FAIL-[qualifier2]/etc. In addition, the discrete states SOMETIMES-PASS, SOMETIMES-FAIL, SOMETIMES-FAIL-[qualifier] may be used to track the state of tests that are failing intermittently. As may be appreciated, some faults produce such intermittent evidence.

The cumulative evidence based on the health data supplied from the parametric limit monitor modules 208 can take on the discrete states, such as, for example: UNKNOWN, PASS, FAIL, where those discrete states are assigned to ranges of the parameter. For example, the cumulative evidence may indicate that the position monitor PASSes for positions between −30 and +10 units, is UNKNOWN between +10 and +15 units, and FAILs between +15 and +30 units. The reasoner 204 may also assign an overall discrete state to the cumulative evidence from each monitor module 208. The overall state is FAIL if any range of the parameter FAILs. The overall state is UNKNOWN if any range of the parameter is UNKNOWN and no range is FAIL. The overall state is PASS if the entire range of the parameter is PASS. In addition, the discrete states SOMETIMES-PASS, SOMETIMES-FAIL may be used to track the overall state of parametric tests that are failing intermittently.

Before proceeding further, it is noted that, at least generally, a control parameter has a nominal upper limit and a nominal lower limit. Some control parameters are expected to experience only upper limit degradation, others only lower limit degradation, and still others both upper and lower limit degradation. For parametric limit monitor modules 208 where only the upper limit is expected to degrade, the cumulative evidence tracks the UNKNOWN, PASS and FAIL regions of the parameter by tracking the boundary of the values that are known to produce PASS results, and the boundary of the values that are known to produce FAIL results. Between those boundaries, the state is UNKNOWN. PASS results are expected between the lower nominal limit and the PASS boundary. FAIL results are expected between the FAIL boundary and the upper nominal limit. For parametric limit monitors where only the lower limit is expected to degrade, the aforementioned boundaries are reversed. For bidirectional parametric limit monitors, the aforementioned boundaries are tracked for both the upper and lower limits.

In an alternate implementation, the range of the control parameter may be partitioned a priori into fixed segments, and the reasoners cumulative evidence assigns a PASS/FAIL/UNKNOWN state to each individual segment.

The subsystem reasoner 204 associates each parametric control capability that it outputs with at least one parametric monitor that measures it. The subsystem reasoner 204 does not report the degradation of a parametric control capability simply because the associated parametric monitor 208 fails. This is because various faults may cause a monitor module 208 to produce a fail result, perhaps even intermittently, not all of which should be characterized as a degradation of the parametric control capability. Hence, the subsystem reasoner 204 implements diagnostic inference to isolate the problem to an ambiguity group of one or more faults. Once the ambiguity group is reduced such that all faults in the ambiguity group point to a common failure/degradation, the reasoner 204 concludes that the parametric control capability is degraded with the measured value. As an example, assume that a device has upper and lower position limits as a control capability, and that a parametric position limit monitor module 208 observes that the device fails to go to the commanded position. However, rate and bandwidth problems could also cause the position monitor to intermittently fail. In such an instance, the subsystem reasoner 204 will not characterize it as degraded position limits for the control effector 109 until it first rules out faults that are characterized as degraded rate or bandwidth limits. For purposes of interfacing to an adaptive controller for automatic fault recovery, the reasoner 204 is designed to report that the control effector 109 is fully capable until it can characterize the problem as a particular failure or degradation. This does not preclude the health management system from reporting early indications of faults for other consumers, such as human operators and maintenance systems.

Figure 3:
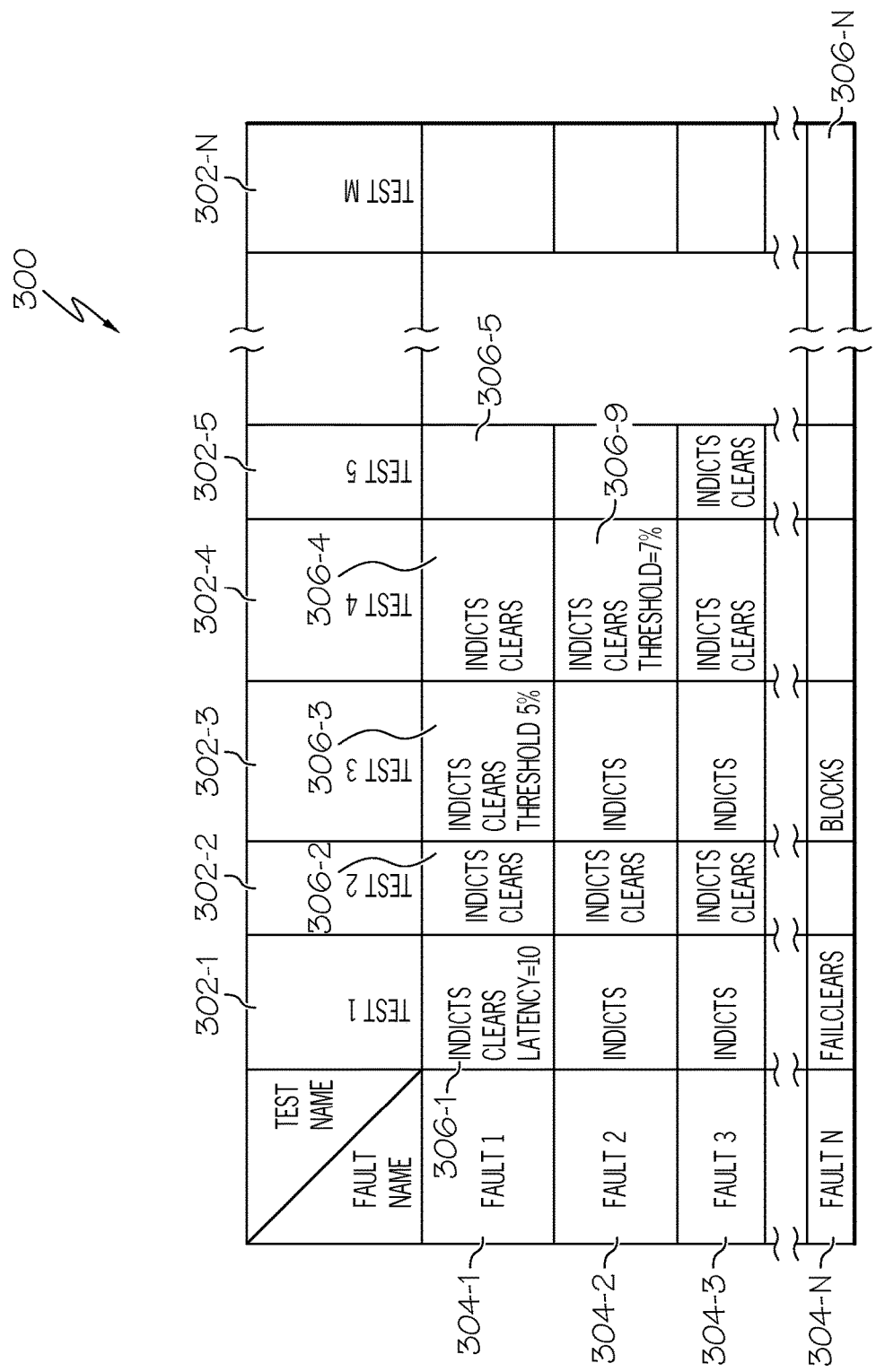
FIG. 3 depicts an example knowledge base of a reasoner, which illustrates a portion of the functionality of the subsystem health management system.
Figure 5:
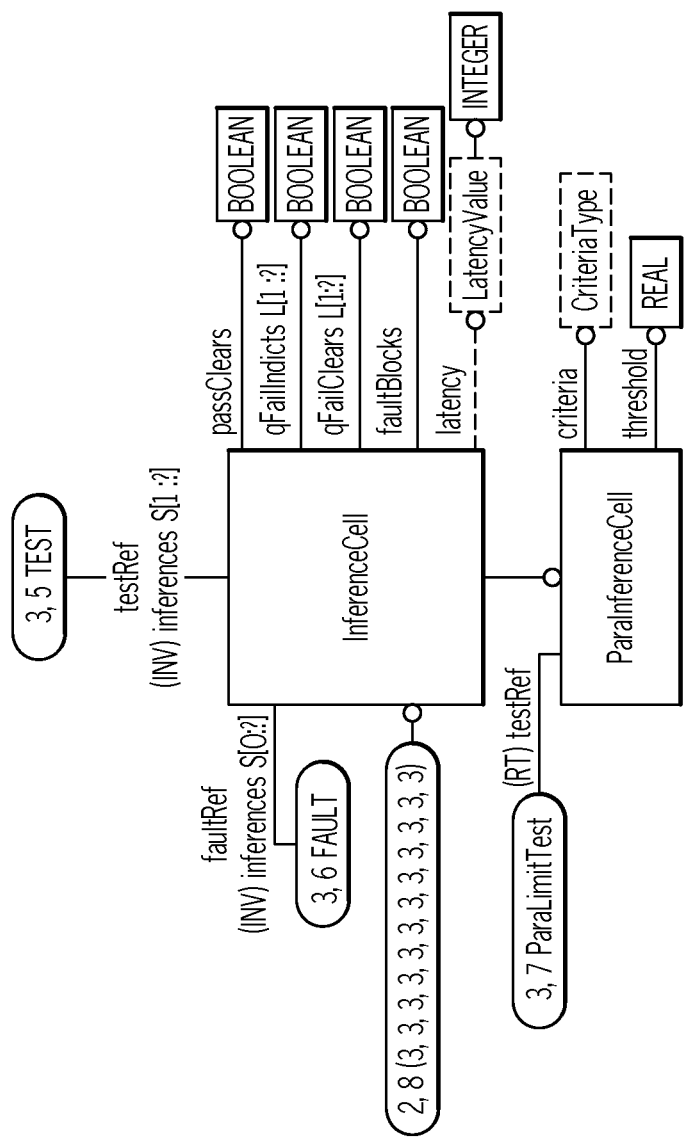
FIGS. 5-8 depict, in the ISO 10303-11 EXPRESS-G format, an information model of the knowledge base of a reasoner that may be used in the subsystem health management system.

To more clearly illustrate how the subsystem reasoner 204 implements the above-described functionality, reference should now be made to FIG. 3, which depicts an example of the knowledge base 300 that the reasoner uses for diagnosis. The knowledge base 300 includes a plurality of columns 302 (302-1, 302-2, 302-3, . . . 302-N), each one of which is associated with a test, and a plurality of rows 304 (304-1, 304-2, 304-3, . . . 304-N), each of which is associated with a particular fault, to thereby form a plurality of what are referred to herein as inference cells 306 (306-1, 306-2, 306-3, . . . 306-N). Reference may also be made to FIG. 5, which depicts an inference cell in the context of an information model schema expressed in the ISO 10303-11 EXPRESS-G format.

Each inference cell 306 represents inference relationships between a particular fault and a particular test. An empty cell indicates there is no inference relationship. The "clears" notation indicates a particular test 302 passing exonerates a particular fault. Conversely the 'indicts' notation indicates a particular test 302 failing calls a particular fault into suspicion. For example, Test 1 will, if it passes, clear only Fault 1, whereas Test 2, if it passes, will clear Fault 1, Fault 2, and Fault 3. However, Test 1 and Test 2 will, upon failure, each indict Fault 1, Fault 2, and Fault 3 as potential suspects. The "failClears" notation indicates that a particular test 302 failing clears a particular fault. The "blocks" notation indicates that the presence of a particular fault would prevent a particular test from properly detecting other faults. A "latency" number indicates an upper time bound for a fault to propagate to a particular test, such that the reasoner should allow the specified latency to expire before the test passing can clear the fault. A "threshold" number indicates that a fault may be cleared if the degradation of the parameter measured by the test does not meet the threshold.

Figure 6:
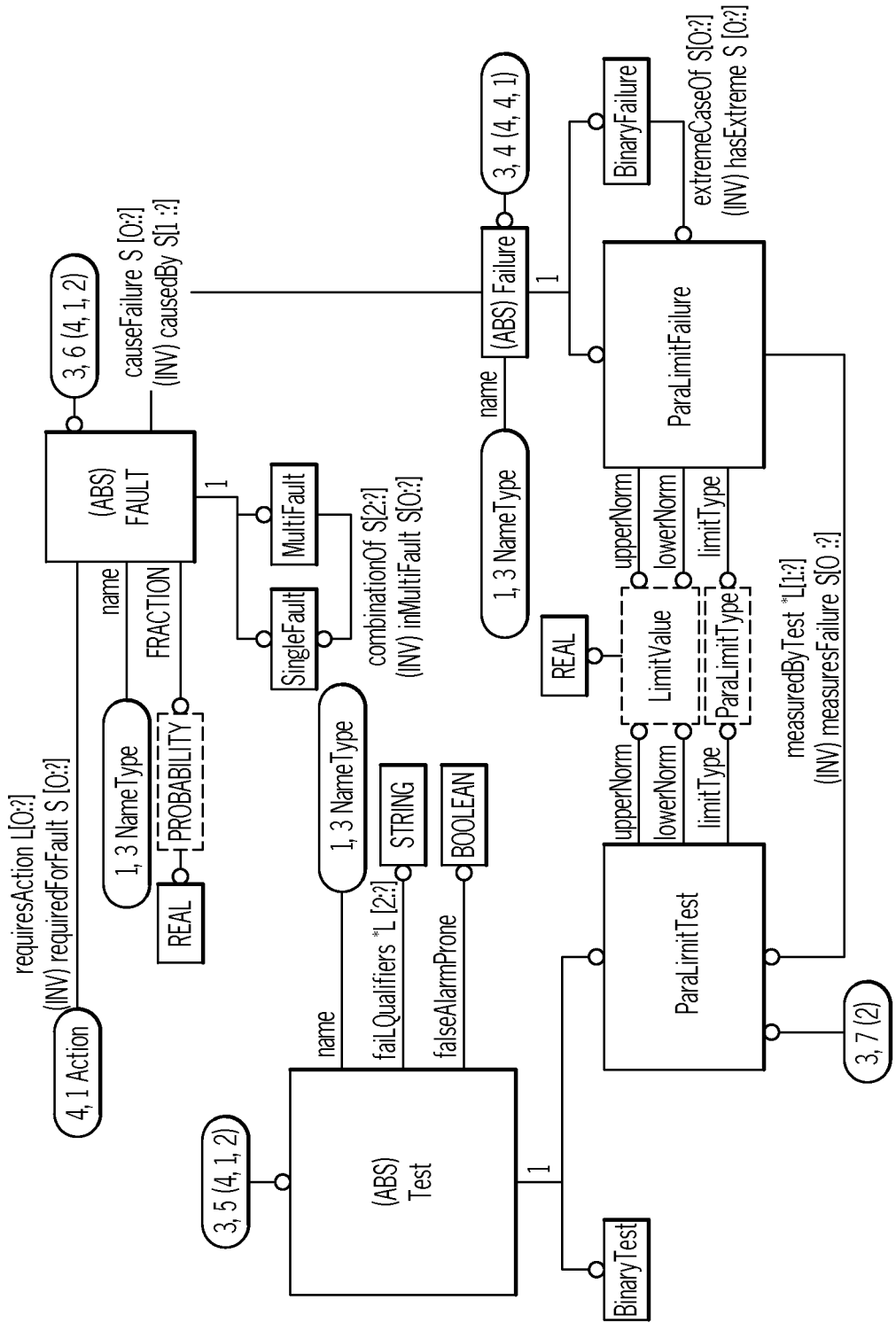
Figure 7:
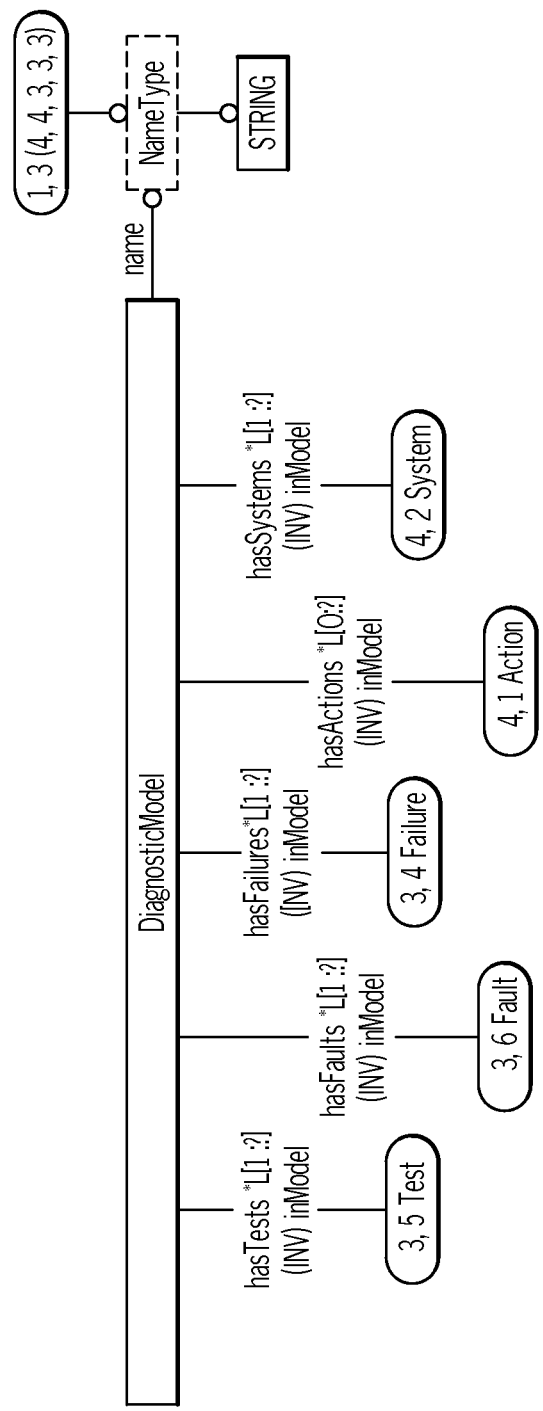
Figure 8:
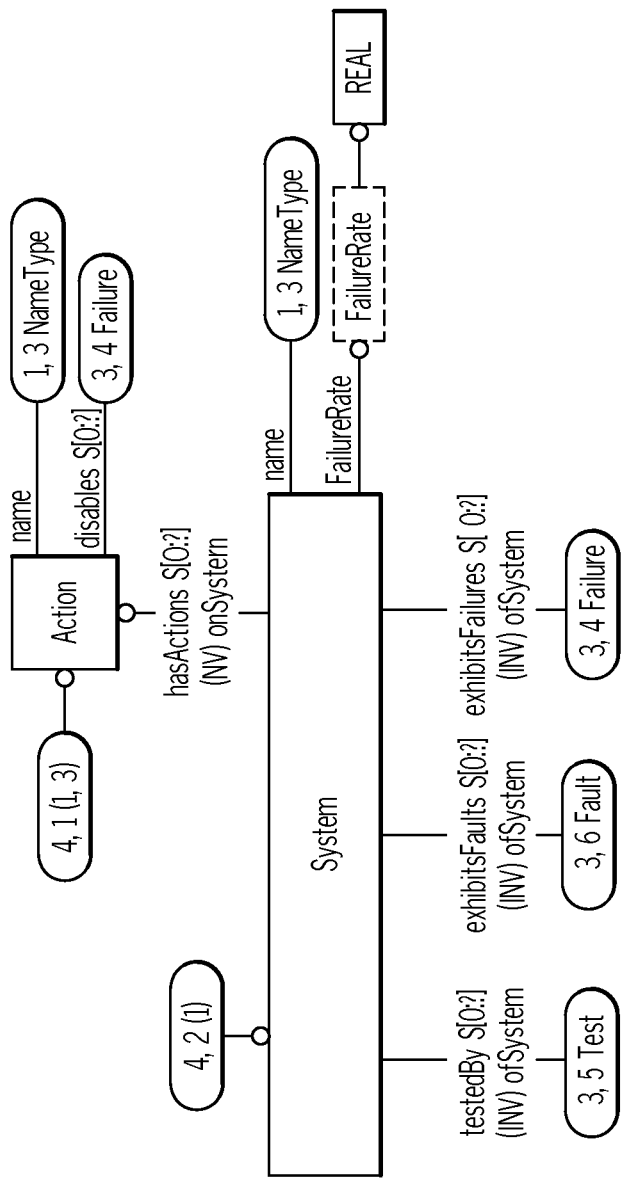

Hence, throughout operation of the subsystem health management system 104, the subsystem reasoner 204 is receiving health data from the tests module 202 and, based on these health data, is continuously clearing and indicting faults. The subsystem reasoner 204 additionally includes data that associates each fault (or various combinations of faults) with zero or more failures. The subsystem reasoner 204, based on the faults that are indicted by each of the tests, determines whether one or more failures are present. The failures are also preferably categorized as either "binary" failures or "parametric" failures. A binary failure is a failure that represents the complete loss of an effector capability. Conversely, a parametric failure represents a degradation of an effector capability. Thus, a parametric failure will also provide additional information to quantify the degradation in terms of new limits to an effector capability. It is noted that the functionality described in this paragraph is depicted in the information model schema depicted in FIG. 6.

The list of faults in FIG. 3 may include some faults that are physically external to the effector, because such faults can nevertheless impact the capability of the effector. By way of example, a fault in the power and distribution system that feeds an effector could result in a "float" failure of the effector. Similarly the list of tests in FIG. 3 may include some tests that primarily verify the health of systems outside of the physical effector, as indict or clear said external faults that impact the capability of the effector.

A combination of binary and parametric failures may be used for discrete-domain effectors (those that receive discrete command values) and for continuous-domain effectors (those that receive continuously variable command values). The choice of failures is driven in part by what the adaptive control system can respond to. By way of example, a discrete-domain effector, such as an On/Off thruster rocket, can have binary failures such as "stuck on" and "stuck off" as well as parametric failures such as "degraded bandwidth", "degraded duty cycle", "degraded maximum time on", "degraded minimum time on" and "degraded minimum time off". A continuous-domain effector, such as an aerodynamic control surface, can have binary failures such as "stuck" and "floating" as well as parametric failures such as "degraded position limits", "degraded rate limits", "degraded bandwidth limits" and "degraded load limits".

Figure 4:
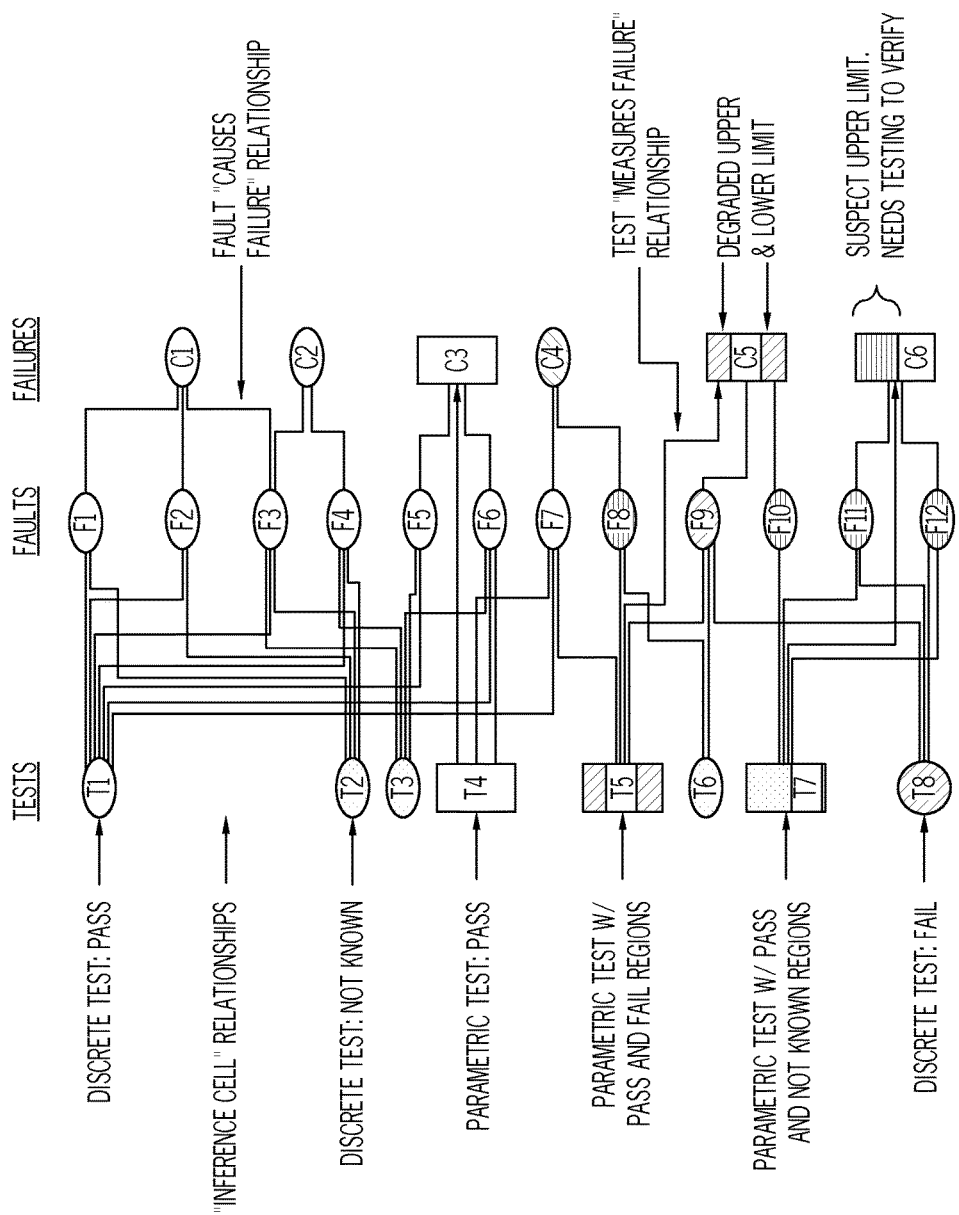
FIG. 4 graphically depicts a simplified representation of the overall functionality of the subsystem health management system.

A simplified representation of the overall functionality of the subsystem health management system 104 is depicted in FIG. 4, and should now be referenced. This figure graphically depicts three columns—a Test column 402, a Faults column 404, and a Failures column 406. The schema that is used depicts binary tests, binary faults, and binary failures with ellipses, and depicts parametric tests, and parametric failures with rectangles. It is noted that the vertical sides of each rectangle represent the parametric value resultant associated with that particular parametric test. As seen, Test T4 indicates that this test passes throughout its entire range. Thus, Test 4 clears Faults F6 and F7, and also clears Failure C3 throughout its entire range. Moreover, Failure C3 has been cleared by Test T1, which cleared Faults F1-F7.

Conversely, Test T5 is shown to be failing in both the upper and lower portions of the range, and thereby indicts Faults F7, F8, and F9. Moreover, because Fault F9 is also indicted by Test T8 (and is neither cleared nor indicted by Test T6), then Failure C5 is indicted as having degraded upper and lower limits. For completeness, it is noted that the results of Tests T2, T3, and T6 are not known, and Test T7 is a pass with an unknown upper limit region. As a result, Faults F8, F10, F11, and F12, and Failures C4 and a portion of C6, are depicted as neither cleared nor indicted, which means these Failures and Faults are suspect or, in the case of Failure C6, partially suspect.

Certain faults require immediate actions to prevent further harm to the vehicle 110. The subsystem reasoner 204 supplies commands, as needed, based on the isolated faults. Some actions have the effect of removing capability, and the subsystem reasoner 204 supplies the lost/degraded capabilities to the control law.

The subsystem reasoner 204 implements a knowledge base to compute its conclusions. An information model of the knowledge base is depicted in FIGS. 5-8 in the ISO 10303-11 EXPRESS-G format. As may be appreciated, the data that are supplied to the depicted information model will be transformed to structures that are dependent on the software implementation language and real-time execution.

For those failures whose status is uncertain, meaning unknown or only suspected (or partially suspected) failures (e.g., Failures C4 and C6 in the above-described example), the subsystem reasoner 204 needs to obtain additional information to verify whether the failure is present or absent and to determine the parametric limits. To do so, the subsystem reasoner 204 is additionally configured to implement what is referred to herein as an initiated test sequence. That is, rather than wait on additional information to be generated and supplied by the tests module 202, the subsystem reasoner 204 will determine one or more test excitation signals to supply to the suspected control effector 109 to verify whether the suspected failure is an actual failure. The subsystem reasoner 204 will then supply the one or more test excitation signals to the vehicle control system 102. The initiated tests may vary, and may include, for example, rate tests, position tests, or any one of numerous other tests. One or more initiated test sequences may occur during system operation or upon initiation of system operation.

The vehicle control system 102, upon receipt of the test excitation signals, will supply test excitation signals to each of the suspect control effectors 109. In addition, the vehicle control system 102 will, if necessary, supply control signals to one or more of the other control effectors 109 to compensate for the motion of the control effector 109 that is under test. As may be appreciated, this is done in order to maintain desired control of the vehicle. For example, in the context of an autonomous flight vehicle with several control surfaces for control effectors, if the reasoner 204 is uncertain about the capabilities of one of the control effectors 109-1, it may command that control effector 109-1 to move so that enough information is obtained to verify whether or not a suspected fault is indeed present and to determine the new upper and lower limits to the usable range of motion. At the same time, one or more other control effectors 109-2 through 109-N may be commanded to move in a manner that counteracts any pitch, roll, or yaw moments created by the control effector 109-1 undergoing the initiated test sequence. The necessary commands to the other control effectors 109-2 through 109-N are determined by the vehicle control system. To further ensure that control is maintained, the vehicle control system 102 may treat the supplied test excitation signals as merely "preferred" command signals, and the vehicle control system 102 may deviate from the test excitation signals in its actual commands to the suspected control effector 109-1 as necessary to maintain control.

Figure 9:
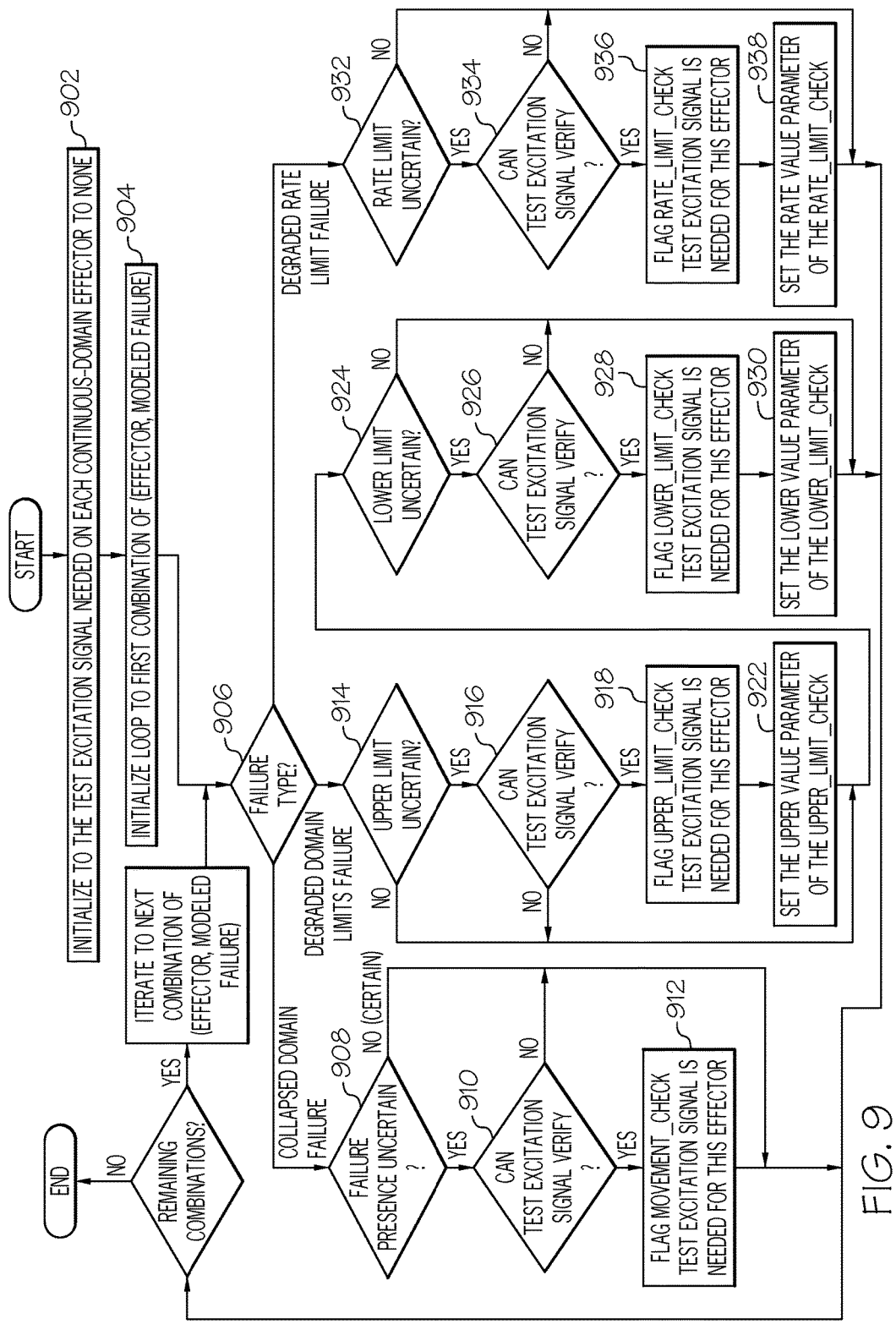
FIGS. 9-11 depict different processes, in flowchart form, that may be implemented in the reasoner of FIG. 2 to verify a suspected fault.
Figure 10:
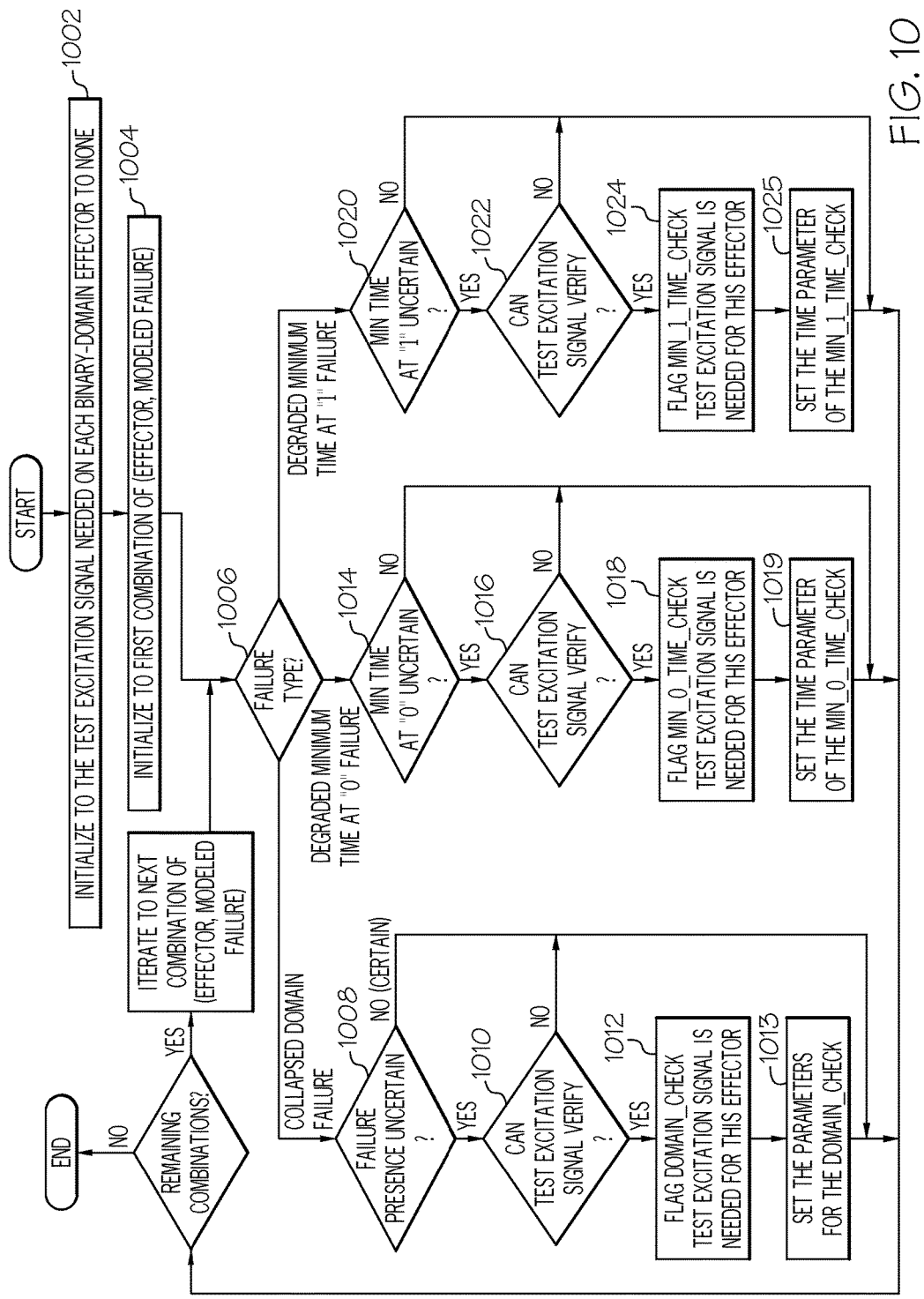
Figure 11:
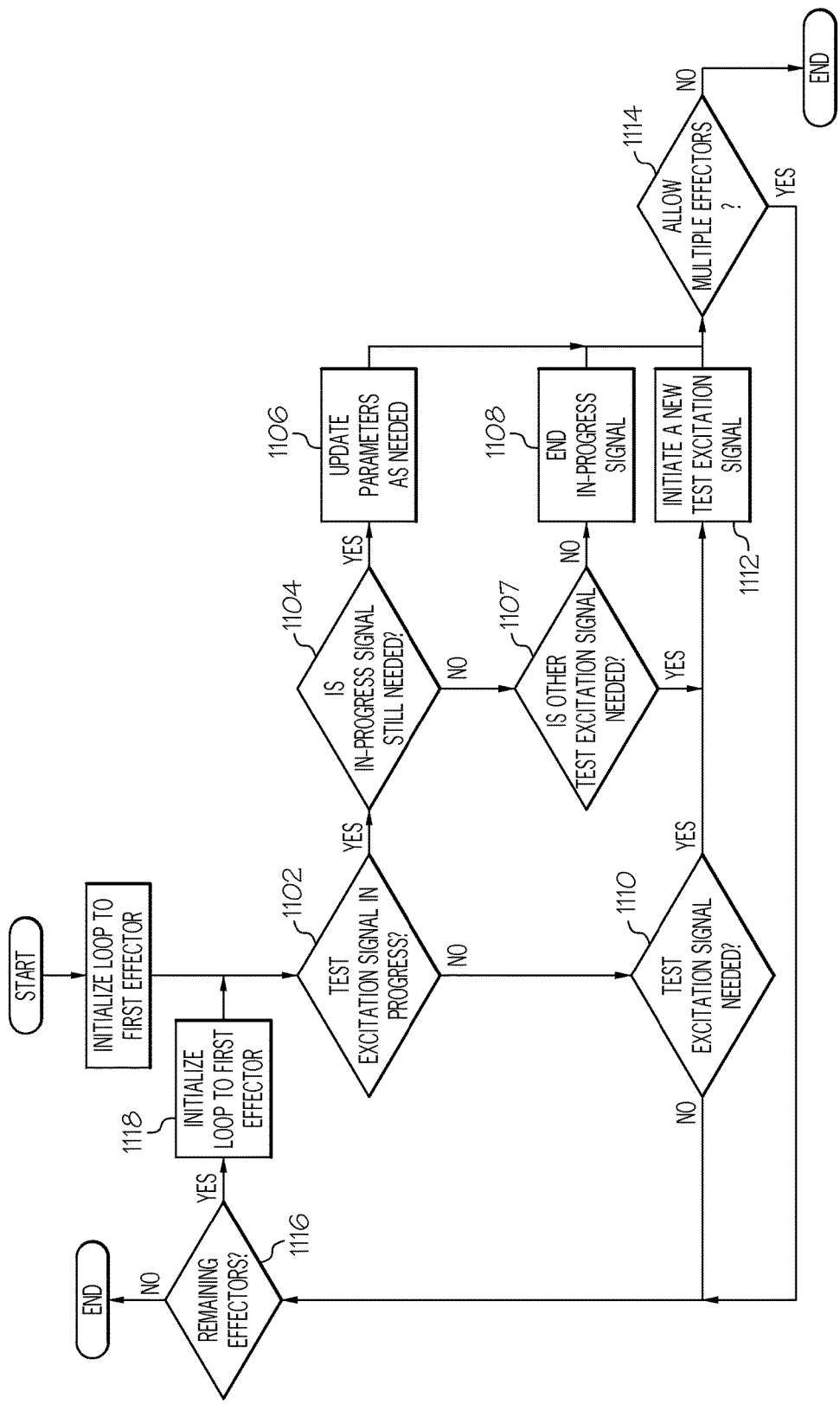

The processes implemented in the reasoner 204 to carry out the above-described functionality are depicted in flowchart form in FIGS. 9-11, and will be described momentarily. Before doing so, it is noted that the process 900 depicted in FIG. 9 is illustrative of the process the reasoner 204 implements to determine whether a test excitation signal is needed for continuous-domain control effectors 109. That is, for control effectors 109 that may be commanded to any position between two limits, such as control effectors 109 that may be used to move vehicle control surfaces. The process 1000 depicted in FIG. 10 is illustrative of the analogous process the reasoner 204 implements for binary-domain control effectors 109. That is, for discrete-domain control effectors 109 that may be commanded to either of two values, for example, to OFF and ON, such as vehicle attitude thrusters. In general, we will refer to the two command values of a binary-domain effector generically as "0" and "1". The flowchart in FIG. 11 illustrates the process 1100 the reasoner 204 implements to manage the test excitation signals called for by processes 900 and 1000, which includes initiating a signal, updating signal parameters, ending a signal, and handling situations where multiple test excitation signal(s) have been called for. The processes 900, 1000, and 1100 run many times throughout the mission at high frequency so that the health management system can promptly receive the information it needs to diagnose the capabilities of the system.

The reasoner 204 first determines the health of each control effector 109 to the extent possible using the processes described above and the information obtained up to the current point in time. Then, referring first to FIG. 9, it is seen that the list of needed test excitation signals are initialized to NONE (902) at the start of each cycle through process 900, and the loop is initialized (904). That is, each cycle through process 900 re-computes "from scratch" the list of test excitation signals that are needed. Once a test excitation signal produces the information the reasoner 204 needs, it will stop appearing in the list in subsequent cycles. For each modeled failure on each continuous-domain control effector 109, the reasoner 204 determines the type of failure (906). Although, as already noted, the types of failures may vary, in the depicted embodiment, in which the control effectors 109 are continuous-domain effectors for a vehicle, the types of failures include a collapsed domain failure (e.g., stuck or float or unpowered), degraded domain limit failures (e.g., degraded upper or lower position limits), or a degraded rate limit failure.

For the given type of failure, the reasoner 204 then determines whether there is uncertainty in the absence or presence, and for some types whether there is uncertainty in the degree of the failure, where the determination (908, 914, 924, 926) depends on the type. For a collapsed domain failure, presence or absence is the only question, so the failure is considered (908) certain if it is known to be BAD or known to be GOOD, and is considered to be uncertain if it is UNKNOWN or merely SUSPECT. If the reasoner 204 is certain of the failure, then the process 900 iterates to the next combination of modeled failure and continuous-domain control effector. However, if the reasoner 204 does determine that the failure is uncertain, the reasoner 204 then determines if it should call for one or more test excitation signals to the control effector 109 to resolve the uncertainty (910).

Before proceeding further, it is noted that there are various reasons for the reasoner 204 not to call for test excitation signals at a given time. For example, the reasoner 204 could be waiting for latencies to expire on the monitors 208 that would resolve the uncertainty. The reasoner 204 could determine that the uncertainty is due to a diagnostic ambiguity that the monitors 204 cannot resolve. The reasoner 204 could be configured to preclude certain initiated tests during certain operational phases due to the sensitivity of those phases. The reasoner 204 could determine that the preconditions of the test are not met such that the test would not be able to produce usable information. Or the reasoner 204 could be configured to prevent tests from being performed too frequently in order to limit nuisance testing.

Regardless of the specific reason(s), if a test excitation signal is not called for, then the process 900 moves on to the next combination of modeled failure and continuous-domain control effector. If, however, a test signal is called for, the reasoner 204 determines the one or more test excitation signals to supply to the suspect control effector 109.

As FIG. 9 further depicts, if the uncertain failure is a collapsed domain failure, the reasoner 204 will set MOVEMENT_CHECK as a test excitation signal (912) that is needed for this control effector. When MOVEMENT_CHECK is performed, the reasoner 204 will supply a time-varying test excitation signal to the vehicle controller 102 that will in turn cause the vehicle controller 102 to supply, for example, a command that will move the control effector 109 to a specified position. Then, based on the health data supplied from the tests module 202, the reasoner 204 is able to verify whether or not the failure is present.

If the uncertain failure is a degraded domain limit failure, the reasoner 204 will call for UPPER_LIMIT_CHECK (918) or LOWER_LIMIT_CHECK (928) as the test excitation signal, or both. The corresponding uncertainty determinations (914 and 924) for this failure type consider uncertainty in whether the failure is present or absent, and uncertainty in the degree of degradation of the upper or lower limit. For example, it is possible for the reasoner 204 to be certain that the domain is degraded, but be uncertain of the value of the upper or lower limit. The choice of UPPER_LIMIT_CHECK (918), LOWER_LIMIT_CHECK (928), both, or neither, depends upon whether the upper limit (914) or lower limit (924) is uncertain. If UPPER_LIMIT_CHECK is called for, the process also determines an upper value parameter for the UPPER_LIMIT_CHECK that represents whether the test excitation signal should check all the way to the nominal upper limit, or somewhere short of that (922). This is determined by aggregating the cumulative observations of the subsystem health management system 104 designated to measure the command domain limits for this effector 109. A region of the command domain can be unusable for various reasons, such as being unresponsive to commands or causing unacceptable power draw, with each reason detected by a different monitor 208 designated to measure the failure. If any one or more of the monitors 208 designated to measure the failure determines that a region of the domain is BAD, then that is sufficient for the reasoner 204 to conclude the region is BAD with certainty and there is no need to check that region. The test excitation signal need only go up to, but not including, an upper region already known to be BAD. The upper boundary of the region that needs to be checked is represented in the upper parameter. If no upper region is already known to be BAD, then the upper parameter will indicate the text excitation signal should go to the nominal upper limit. Similarly, if LOWER_LIMIT_CHECK is called for, the process determines a lower value parameter for the LOWER_LIMIT_CHECK that represents whether the test excitation signal should check all the way to the nominal lower limit, or somewhere short of that (930).

When UPPER_LIMIT_CHECK is performed, the reasoner 204 will supply a time-varying test excitation signal to the vehicle controller 102 that will in turn cause the vehicle controller 102 to supply a command following the signal (with possible deviations to maintain control) that will move the control effector 109 to an upper position limit defined by the upper parameter. Similarly, when LOWER_LIMIT_CHECK is performed, the reasoner 204 will supply a test excitation signal waveform to the vehicle controller 102 that will in turn cause the vehicle controller 102 to supply a command that will move the control effector 109 to a lower position limit defined by the lower parameter. In both instances, based on the health data supplied from the tests module 202, the reasoner 204 is able to verify whether or not the suspected failure is an actual collapsed domain limit failure.

For a MOVEMENT_CHECK, UPPER_LIMIT_CHECK, or LOWER_LIMIT_CHECK, the rate-of-change of the text excitation signal should be relatively slow, for example ⅓ of the rate limit of the control effector 109. This should allow the vehicle controller 102 to more easily compensate for the impact of the test using the other control effectors 109, thereby lessening the likelihood of unwanted disturbances to vehicle attitude and of deviations between the command and the test excitation signal. An excessive deviation could prevent the test from obtaining the intended information for the reasoner 204, leading process 900 to call for the test again.

If the suspected failure is a degraded rate limit failure, the reasoner 204 will set RATE_LIMIT_CHECK as the test excitation signal (936). When RATE_LIMIT_CHECK is set, the reasoner 204 will supply a test excitation signal waveform to the vehicle controller 102 that will in turn cause the vehicle controller 102 to supply, for example, a command that will move the control effector 109 at a specified rate in a particular direction within the limits of the command domain. The specified rate may be a rate up to, but not including, any known BAD rate limit, as determined by aggregating the cumulative observations of subsystem health management system 104 designated to measure the command rate limits for this effector 109, or to the nominal rate limit if no rate limit is already known to be BAD. The direction of movement is, for example, whichever direction affords the most range of movement from the current position within the command domain. Then, based on the health data supplied from the tests module 202, the reasoner 204 is able to verify whether or not the suspected failure is an actual degraded domain failure. If RATE_LIMIT_CHECK is called for, the process also determines a value parameter for the RATE_LIMIT_CHECK that represents whether the test excitation signal should check all the way to the nominal rate limit, or somewhere short of that (938).

Referring now to FIG. 10, the depicted process 1000, as noted above, is the process the reasoner 204 implements for binary-domain control effectors. As with the process 900 depicted in FIG. 9, the needed test excitation signals are initialized to NONE (1002) at the start of each cycle through process 1000 (1004). For each modeled failure on each binary-domain control effector 109, the reasoner 204 determines the type of failure (1006). Although, as already noted, the types of failures may vary, in the depicted embodiment, in which the control effectors 109 are binary-domain effectors for a vehicle, the types of failures include a collapsed domain failure (e.g., stuck at "0" or "1"), a degraded minimum time at "0" failure, or a degraded minimum time at "1" failure.

For each type of failure, the reasoner 204 then determines whether there is uncertainty in the presence or absence of the failure, and for some types whether there is uncertainty in the degree of the failure, where the determination (1008, 1014, 1020) depends on the type. If there is no uncertainty, meaning that the reasoner 204 is certain of the failure presence/absence and degree, then the process 1000 iterates to the next combination of modeled failure and binary-domain effector. However, if the reasoner 204 does determine that there is uncertainty failure, the reasoner 204 then determines if supplying one or more test excitation signals to the control effector 109 to resolve the uncertainty (1010, 1016, 1022). If not, then the process 1000 iterates to the next combination of modeled failure and binary-domain effector. If so, however, the reasoner 204 determines the one or more test excitation signals to supply to the suspect control effector 109.

As FIG. 10 further depicts, if the uncertain failure is a collapsed domain failure, the reasoner 204 will set DOMAIN_CHECK and appropriate parameters as the test excitation signal (1012, 1013). When DOMAIN_CHECK is performed, the reasoner 204 will supply a time-varying test excitation signal to the vehicle controller 102 that will in turn cause the vehicle controller 102 to supply, for example, a command that will move the control effector 109 to "0" or "1" or both. Then, based on the health data supplied from the tests module 202, the reasoner 204 is able to verify whether or not the collapsed domain failure is present.

If the uncertain failure is a degraded minimum time at "0" failure, the reasoner 204 will set MIN_0_TIME_CHECK and appropriate time parameter as the test excitation signal (1018, 1019). The corresponding uncertainty determination for this failure type considers uncertainty in whether the failure is present or absent, and uncertainty in the degree of degradation. For example, it is possible for the reasoner to be certain that the minimum time at "0" is degraded, but be uncertain of the value of the minimum time. When MIN_0_TIME_CHECK is performed, the reasoner 204 will supply a time-varying excitation signal to the vehicle controller 102 that will in turn cause the vehicle controller 102 to supply, for example, a command to the control effector 109 to "0" for varying times down to a predetermined time. The predetermined time may be a time down to, but not including, any known BAD time, as determined by aggregating the cumulative observations of subsystem health management system 104 designated to measure the minimum time at "0" for this effector 109, or to the nominal minimum time if no time is already known to be BAD. Then, based on the health data supplied from the tests module 202, the reasoner 204 is able to verify whether an actual degraded minimum time at "0" failure is present, and the degree of the degradation.

Similarly, if the uncertain failure is a degraded minimum time at "1" failure, the reasoner 204 will set MIN_1_TIME_CHECK and appropriate time parameter as the test excitation signal (1024, 1025). When MIN_1_TIME_CHECK is performed, the reasoner 204 will supply a time-varying test excitation signal to the vehicle controller 102 that will in turn cause the vehicle controller 102 to supply, for example, a command to the control effector 109 to "1" for varying times down to a predetermined time. The predetermined time may be a time down to, but not including, any known BAD time, as determined by aggregating the cumulative observations of subsystem health management system 104 designated to measure the minimum time at "1" for this effector 109, or to the nominal minimum time if no time is already known to be BAD. Then, based on the health data supplied from the tests module 202, the reasoner 204 is able to verify whether an actual degraded minimum time at "1" failure is present, and the degree of the degradation.

With reference now to FIG. 11, whenever the process 900 depicted in FIG. 9 or the process 1000 depicted in FIG. 10 determine that a test excitation signal is called for, the process 1100 depicted in FIG. 11 implements those test excitation signals. In particular, for each control effector 109 the reasoner 204 determines if a test excitation signal for that control effector 109 is in progress (1102). If so, then the reasoner 204 considers if the in-progress test excitation signal is still needed (1104) as determined by processes 900 and 1000. If so, the reasoner 204 updates the parameters of the in-progress test excitation signal as needed per any updated settings determined in process 900 and/or 1000 (1106). If not, then the reasoner 204 determines if another test excitation signal is needed (1107). If so, then the reasoner 204 supplies a new test excitation signal for this control effector 109 to the vehicle control system 102 as determined by process 900 and/or 1000 (1112). If not, then the in-progress test excitation signal is ended (1108). Thus, the test excitation signal ends once the reasoner 204 obtains the information it needed, or once the test signal reaches its natural conclusion, whichever comes first. A test excitation signal ends with either a signal that gracefully returns the control effector 109 to normality (1108), or with the start of some other excitation signal for the current control effector 109 that is called for by processes 900 and/or 1000.

If the reasoner 204 previously determined that a test excitation signal for a control effector 109 is no longer in progress (1102), the reasoner 204 then determines whether process 900 and/or 1000 has determined that a test excitation signal is needed for the control effector 109 (1110). If not, the process 1100 iterates to the next effector. If so, then the reasoner 204 supplies a new test excitation signal for this control effector 109 to the vehicle control system 102 as determined by process 900 and/or 1000 (1112).

After steps 1106, 1108, or 1112, the reasoner 204 also checks to determine if the system 100 is configured to allow multiple control effectors 109 to be simultaneously excited (1114). If so, then the process 1100 iterates to the next effector(s) 109 (1116, 1118). If not, then the process 1100 ends.

Process 1100 permits at most one test excitation signal to be in progress on a given control effector 109 at a given time. However, processes 900 and 1000 can call for zero, one, or more test excitation signals on a single control effector 109, since it is possible to have multiple failure types that are uncertain. The reasoner 204 handles the multiple-test situation in several ways. One way is that once a test excitation signal is in progress, 1102, 1104 and 1106, the reasoner 204 will continue with that test excitation until it completes or is no longer needed, even though processes 900 and 1000 might call for other test excitation signals in the meantime. Another way is that the reasoner 204, in step 1112, can prioritize the test excitation signals to perform first when more than one is called for, with the goal of accelerating diagnosis and lessening any disruption to the vehicle caused by the test excitation signals.

For example, if a MOVEMENT_CHECK and an UPPER_LIMIT_CHECK are both called for, then the reasoner 204 will select the UPPER_LIMIT_CHECK to perform first because it potentially resolves both of the uncertain failures such that the MOVEMENT_CHECK may no longer be needed. For similar reasons, the reasoner 204 will select the LOWER_LIMIT_CHECK to perform first if a MOVEMENT_CHECK and an LOWER_LIMIT_CHECK are both called for. If all three are called for, MOVEMENT_CHECK, UPPER_LIMIT_CHECK, and LOWER_LIMIT_CHECK, then the reasoner 204 could select either the UPPER_LIMIT_CHECK or LOWER_LIMIT_CHECK to perform first, followed by the other, under the expectation that both will ultimately need to be performed, and either could lead to the MOVEMENT_CHECK no longer being needed.

If the RATE_LIMIT_CHECK is called for at the same time as one or more of the above, the reasoner 204 could defer the RATE_LIMIT_CHECK until last, under the thinking that the other checks might complete successfully without encountering a degraded rate limit. The RATE_LIMIT_CHECK could then be performed with better knowledge of whether the upper or lower direction has more range to perform the RATE_LIMIT_CHECK.

Figure 12:
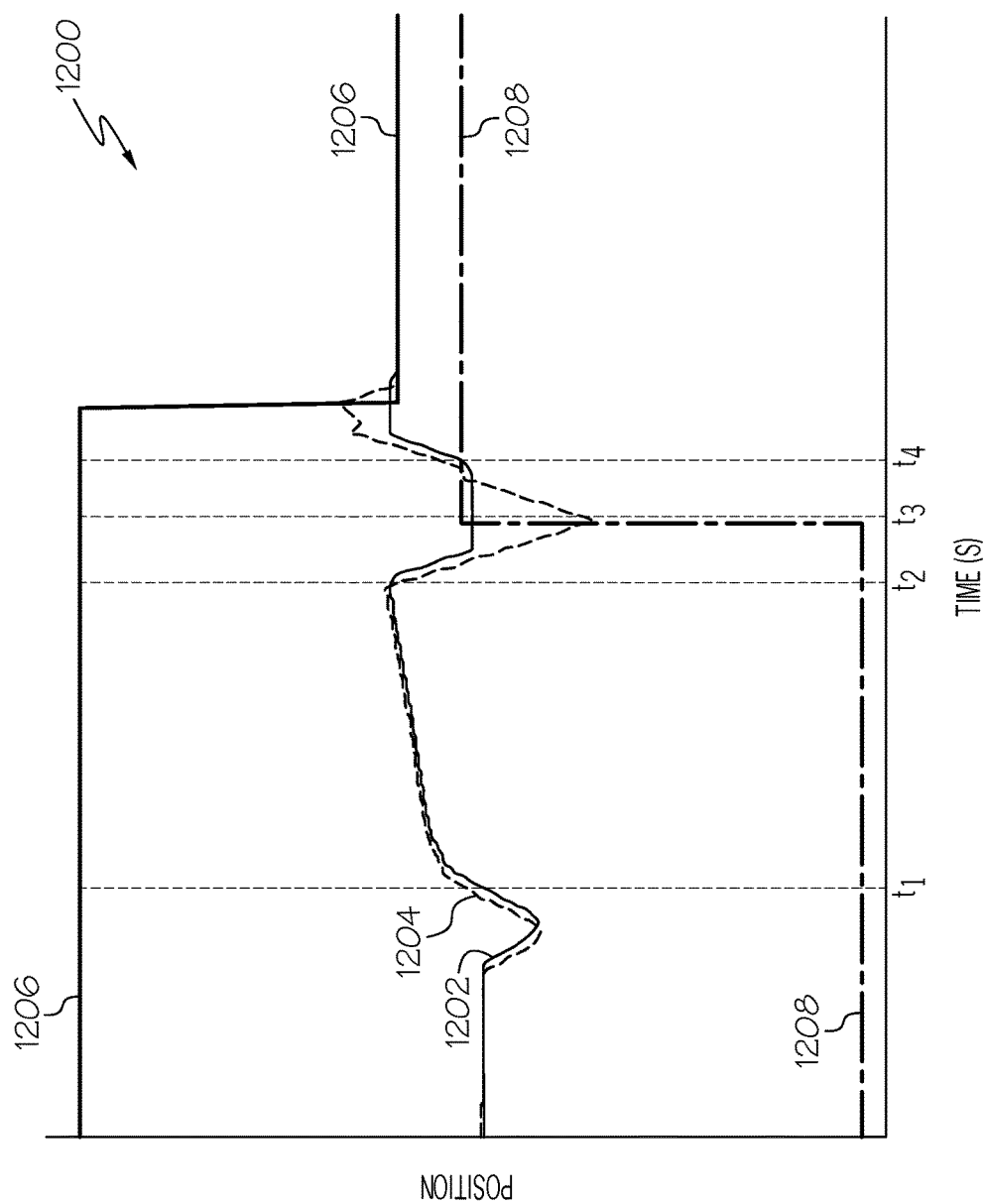
FIG. 12 graphically depicts data for the system of FIG. 1 in which a continuous-domain control effector suffers a degraded domain limit failure.

An example of the operation of the system 100, including the methodology described above for verifying an uncertain failure will now be described. In doing so, reference should be made to FIG. 12, which graphically depicts data for a continuous-domain control effector 109 that suffers a degraded domain limit failure, of both the upper and lower limits, during vehicle operation. In the depicted graph 1200, line 1202 represents the actual control effector position, line 1204 represents the command supplied to the control effector 109, lines 1206 and 1208 depict, respectively, what health management subsystem 104 believes to be the upper and lower limits.

With this background in mind, at t1 the actual failure occurs. It is not until t2, however, that the reasoner 204 suspects a failure and thus supplies a test excitation signal to glean more information. As readily depicted, although the failure occurs at t1, the control effector 109 is not commanded toward the lower limit until after the test excitation signal is supplied (between t2 and t3). At the conclusion of the initiated test (e.g., at t3), the reasoner 204 has determined a new lower position limit 1208. A short time later at t4, the control effector 109 is commanded to move toward the upper limit, at which time the health management subsystem 104 readily identifies that the upper limit 1206 needs to also be changed.

The system and methods described herein accelerate the information flow into a health management system to be able to provide more prompt diagnoses of system health.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention.

What is claimed is:

1. A method for verifying the response capabilities of a control effector, the method comprising the steps of:
    processing, in a test module, at least command data and sensor data associated with the control effector to generate control effector health data representative of control effector health; and
    processing the control effector health data in a reasoner to:
        (i) selectively indict and clear one or more faults,
        (ii) determine a failure is uncertain based on the one or more indicted faults,
        (iii) determine whether one or more test excitation signals will be useful to verify whether the uncertain failure is present or absent,
        (iv) if one or more test excitation signals will indeed be useful, determine the one or more test excitation signals to supply to the control effector, and
        (v) supply the one or more test excitation signals to a controller that is in operable communication with the control effector; and
    supplying the one or more test excitation signals from the controller to the control effector.

2. The method of claim 1, further comprising:
    processing, in the test module, sensor data associated with the control effector while the one or more test excitation signals are being supplied to the control effector to generate updated control effector health data; and
    processing the updated control effector health data in the reasoner to verify whether the uncertain failure is present or absent.

3. The method of claim 2, further comprising:
    determining, based on the actual failure, a usable range of control effector commands to which the control effector can respond.

4. The method of claim 3, further comprising:
    supplying the usable range of control effector commands to an adaptive control system.

5. The method of claim 1, wherein the uncertain failure is a collapsed domain of a binary-domain effector.

6. The method of claim 1, wherein the uncertain failure is a minimum time at a certain value of a binary-domain effector.

7. The method of claim 1, wherein the uncertain failure is a collapsed domain of a continuous-domain effector.

8. The method of claim 1, wherein the uncertain failure is a degraded upper limit of a continuous-domain effector.

9. The method of claim 1, wherein the uncertain failure is a degraded lower limit of a continuous-domain effector.

10. The method of claim 1, wherein the uncertain failure is a degraded rate limit of a continuous-domain effector.

11. A system for determining the response capabilities of a control effector, comprising:
a control effector configured, in response to one or more excitation signals, to control the position of one or more devices;
a test module configured to receive at least command data and sensor data associated with the control effector, the test module configured, upon receipt of these data, to generate control effector health data representative of control effector health; and
a reasoner coupled to receive the control effector health data and configured, in response thereto, to (i) selectively indict and clear one or more faults, (ii) determine a failure is uncertain based on the one or more indicted faults, (iii) determine whether one or more test excitation signals will be useful to verify whether the uncertain failure is present or absent, (iv) if one or more test excitation signals will indeed be useful, determine the one or more test excitation signals to supply to the control effector, and (v) supply the one or more test excitation signals; and
a controller in operable communication with the control effector and the reasoner, the controller coupled to receive the one or more test excitation signals from the reasoner and configured, upon receipt thereof, to supply the one or more test excitation signals to the control effector.

12. The system of claim 11, wherein:
the test module is further configured to process sensor data associated with the control effector while the one or more test excitation signals are being supplied to the control effector to generate updated control effector health data; and
the reasoner is further configured to process the updated control effector health data to verify whether the uncertain failure is present or absent.

13. The system of claim 12, wherein the reasoner is further configured, based on the actual failure, to determine a usable range of control effector commands to which the control effector can respond.

14. The system of claim 11, wherein:
the control effector is a binary-domain effector; and
the uncertain failure is one or more of a collapsed domain, and a minimum time at a certain value.

15. The method of claim 11, wherein:
the control effector is a continuous-domain effector; and
the uncertain failure is one or more of a collapsed domain, a degraded upper limit, a degraded lower limit, and a degraded rate limit.

* * * * *